United States Patent
Park et al.

(10) Patent No.: US 7,057,991 B2
(45) Date of Patent: Jun. 6, 2006

(54) METHOD AND APPARATUS DETECTING A DEFECT SIGNAL OF OPTICAL DISC

(75) Inventors: Hyun-soo Park, Seoul (KR); Jao-seong Shim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 462 days.

(21) Appl. No.: 10/444,950

(22) Filed: May 27, 2003

(65) Prior Publication Data
US 2003/0223145 A1      Dec. 4, 2003

(30) Foreign Application Priority Data
May 28, 2002    (KR)    ............. 10-2002-0029556

(51) Int. Cl.
*G11B 7/00*   (2006.01)
(52) U.S. Cl. ............................ 369/53.15; 369/53.33
(58) Field of Classification Search ............ 369/53.15, 369/53.16, 53.33, 44.25, 44.26
See application file for complete search history.

(56) References Cited

U.S. PATENT DOCUMENTS

| | | | | |
|---|---|---|---|---|
| 6,172,953 | B1 * | 1/2001 | Kamiyama | 369/53.15 |
| 6,333,902 | B1 * | 12/2001 | Shim | 369/47.54 |
| 2005/0088929 | A1 * | 4/2005 | Tada et al. | 369/44.28 |

* cited by examiner

Primary Examiner—Nabil Hindi
Assistant Examiner—Van Pham
(74) Attorney, Agent, or Firm—Stein, McEwen & Bui, LLP (57) ABSTRACT

An apparatus and method detecting whether a signal read from an optical disc has a defect. The apparatus generates a defect signal of an optical disc and includes an average maximum value detecting unit, an average minimum value detecting unit, an instantaneous maximum value detecting unit, an instantaneous minimum value detecting unit, and a defect signal generating unit. The average maximum value detecting unit receives a predetermined RF signal for a predetermined period of time and calculates an average maximum value of maximum values of the RF signal. The average minimum value detecting unit receives the predetermined RF signal for a predetermined period of time and calculates an average minimum value of minimum values of the RF signal. The instantaneous maximum value detecting unit receives the RF signal and calculates an instantaneous maximum value that is a maximum value of the RF signal at an instant of time when the RF signal is input. The instantaneous minimum value detecting unit receives the RF signal and calculates an instantaneous minimum value that is a minimum value of the RF signal at an instant of time when the RF signal is input. The defect signal generating unit receives the average maximum value, the average minimum value, the instantaneous maximum value, and the instantaneous minimum value and generates a defect signal indicating that the RF signal is abnormal, based on a predetermined peak threshold level and a predetermined bottom threshold level.

36 Claims, 7 Drawing Sheets

METHOD AND APPARATUS DETECTING A DEFECT SIGNAL OF OPTICAL DISC

CROSS-REFERENCE TO RELATED APPLICATIONS

This application claims the priority of Korean Patent Application No. 2002-29556, filed on May 28, 2002, in the Korean Intellectual Property Office, the disclosure of which is incorporated herein in its entirety by reference.

BACKGROUND OF THE INVENTION

1. Field of the Invention

The present invention relates to the detection of whether a signal read from an optical disc has a defect, and more particularly, to an apparatus and method accurately detecting a defect signal regardless of the magnitude of an input signal.

2. Description of the Related Art

In general, data is read from optical discs by radiating laser light onto the surfaces of the optical discs and then converting the strength of the laser light reflected from the optical discs into an electrical signal. The electrical signal is called a radio frequency (RF) signal. The RF signal is converted into a binary signal, the binary signal is demodulated, and the demodulated signal is used to reproduce user data. However, the surface of an optical disc is frequently scratched or covered with dust, resulting in an error in the produced RF signal.

In order to read data from several parts of an optical disc, a laser may jump to a desired position of the optical disc instead of sequentially reading the optical disc from the inner perimeter to the outer perimeter. When jumping positions, the magnitude of the RF signal is reduced so as to be less than the magnitude when the laser performs a normal reading operation. Accordingly, if an abnormal RF signal is input, a signal indicating the abnormality of the RF signal is referred to as a defect signal.

Figure 1:
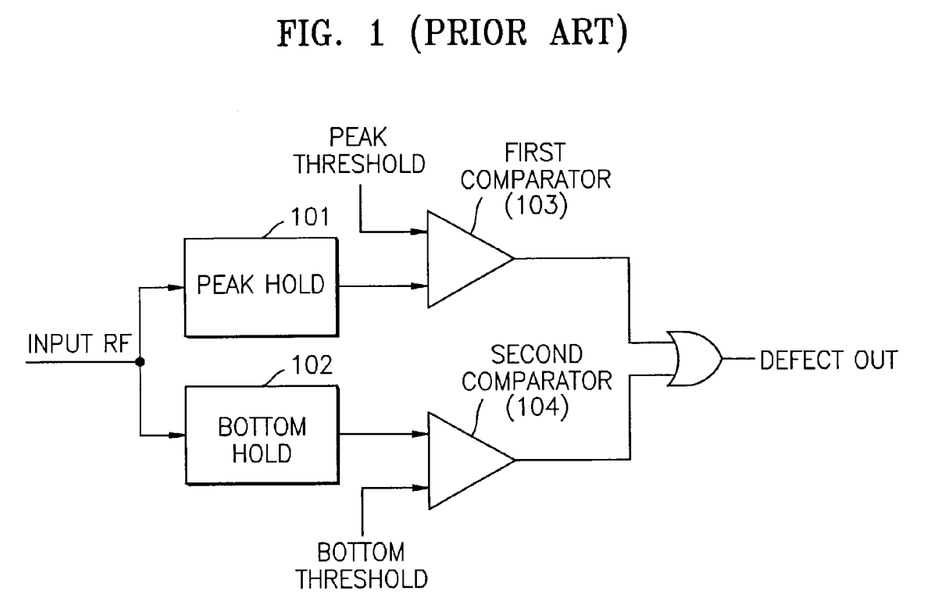
FIG. 1 illustrates the structure of a conventional defect signal detecting apparatus.

FIG. 1 illustrates the structure of a conventional defect signal detecting apparatus. The conventional defect signal detecting apparatus includes a peak holding circuit 101, which follows only a peak level of an input RF signal, and a bottom holding circuit 102, which follows only a bottom level of the input RF signal. The peak holding circuit 101 and the bottom holding circuit 102 generally use filters. If the peak level and the bottom level of the RF signal are detected, a first comparator 103 compares the peak level with a predetermined peak threshold level and a second comparator 104 compares the bottom level with a predetermined bottom threshold level. If the peak level and the bottom level are greater than or smaller than the predetermined threshold levels, the RF signal is detected as a blank signal.

According to the prior art, since a peak holding circuit following only a peak level of an input RF signal and a bottom holding circuit following only a bottom level of the input RF signal use filters, the peak holding circuit and the bottom holding circuit cannot rapidly follow the RF signal. If the peak holding circuit and the bottom holding circuit rapidly follow the RF signal by increasing a threshold frequency of the filters, the increased threshold frequency interferes with a long-period signal band included in the RF signal. Therefore, a defect signal is not properly detected, and as a result, it is difficult to detect an accurate defect signal at an accurate point of time.

In addition, if the strength of the RF signal shifts due to spots on the surface of the optical disc or a difference in the reflectivity of the optical disc, the peak holding circuit and the bottom holding circuit fix the threshold level. Thus, a defect in the RF signal is not properly detected due to the sharp change in the strength of the RF signal.

SUMMARY OF THE INVENTION

The present invention provides a method and apparatus effectively detecting a defect signal even when the strength of an RF signal read from an optical disc is changed.

According to an aspect of the present invention, a defect signal of an optical disc is generated indicating a signal defect. The apparatus includes an average maximum value detecting unit, an average minimum value detecting unit, an instantaneous maximum value detecting unit, an instantaneous minimum value detecting unit, and a defect signal generating unit. The average maximum value detecting unit receives a predetermined RF signal for a predetermined period of time and calculates an average maximum value of maximum values of the RF signal. The average minimum value detecting unit receives the predetermined RF signal for a predetermined period of time and calculates an average minimum value of minimum values of the RF signal. The instantaneous maximum value detecting unit receives the RF signal and calculates an instantaneous maximum value that is a maximum value of the RF signal at an instant of time when the RF signal is input. The instantaneous minimum value detecting unit receives the RF signal and calculates an instantaneous minimum value that is a minimum value of the RF signal at an instant of time when the RF signal is input. The defect signal generating unit receives the average maximum value, the average minimum value, the instantaneous maximum value, and the instantaneous minimum value and generates a defect signal indicating that the RF signal is abnormal, based on a predetermined peak threshold level and a predetermined bottom threshold level.

The average maximum value detecting unit divides the RF signal every period of time T1, calculates maximum values of the RF signal corresponding to every period of time T1, and calculates the average maximum value of the maximum values of the RF signal based on the last maximum value of the RF signal. The average minimum value detecting unit divides the RF signal every period of time T2, calculates minimum values of the RF signal corresponding to every predetermined period of time T2, and calculates the average minimum value of the minimum values of the RF signal based on the last minimum value of the RF signal. The instantaneous maximum value detecting unit calculates the instantaneous maximum value of the RF signal received for a predetermined period of time T3.

The instantaneous minimum value detecting unit calculates the instantaneous minimum value of the RF signal received for a period of time T4. The defect signal generating unit receives the average maximum value, the average minimum value, the instantaneous maximum value, and the instantaneous minimum value, and if the instantaneous maximum value is less than a value obtained by subtracting the predetermined peak threshold value from the average maximum value or the instantaneous minimum value is greater than a value obtained by subtracting the predetermined bottom threshold value from the average minimum value, the defect signal generating unit generates the defect signal, and if not, stops generating the defect signal.

According to another aspect of the present invention, a method of generating a defect signal of an optical disc includes receiving the RF signal corresponding to data recorded on the optical disc. The RF signal is received for a period of time and an average maximum value of maximum values of the RF signal, an average minimum value of minimum values of the RF signal, an instantaneous maximum value that is a maximum value of the RF signal at an instant of time when the RF signal is input, and an instantaneous minimum value that is a minimum value of the RF signal at an instant of time when the RF signal is input are calculated. The average maximum value, the average minimum value, the instantaneous maximum value, and the instantaneous minimum value are received and a defect signal indicating that the RF signal is abnormal is generated based on a predetermined peak threshold level and a predetermined bottom threshold level.

Additional aspects and/or advantages of the invention will be set forth in part in the description which follows and, in part, will be obvious from the description, or may be learned by practice of the invention.

BRIEF DESCRIPTION OF THE DRAWINGS

The above features and/or other aspects and advantages of the present invention will become more apparent by describing in detail embodiments thereof with reference to.

DETAILED DESCRIPTION OF THE PREFERRED EMBODIMENTS

Hereinafter, embodiments of the present invention will be described with reference to the attached drawings, with like reference numerals in the description and the drawings referring to like elements.

Figure 2:
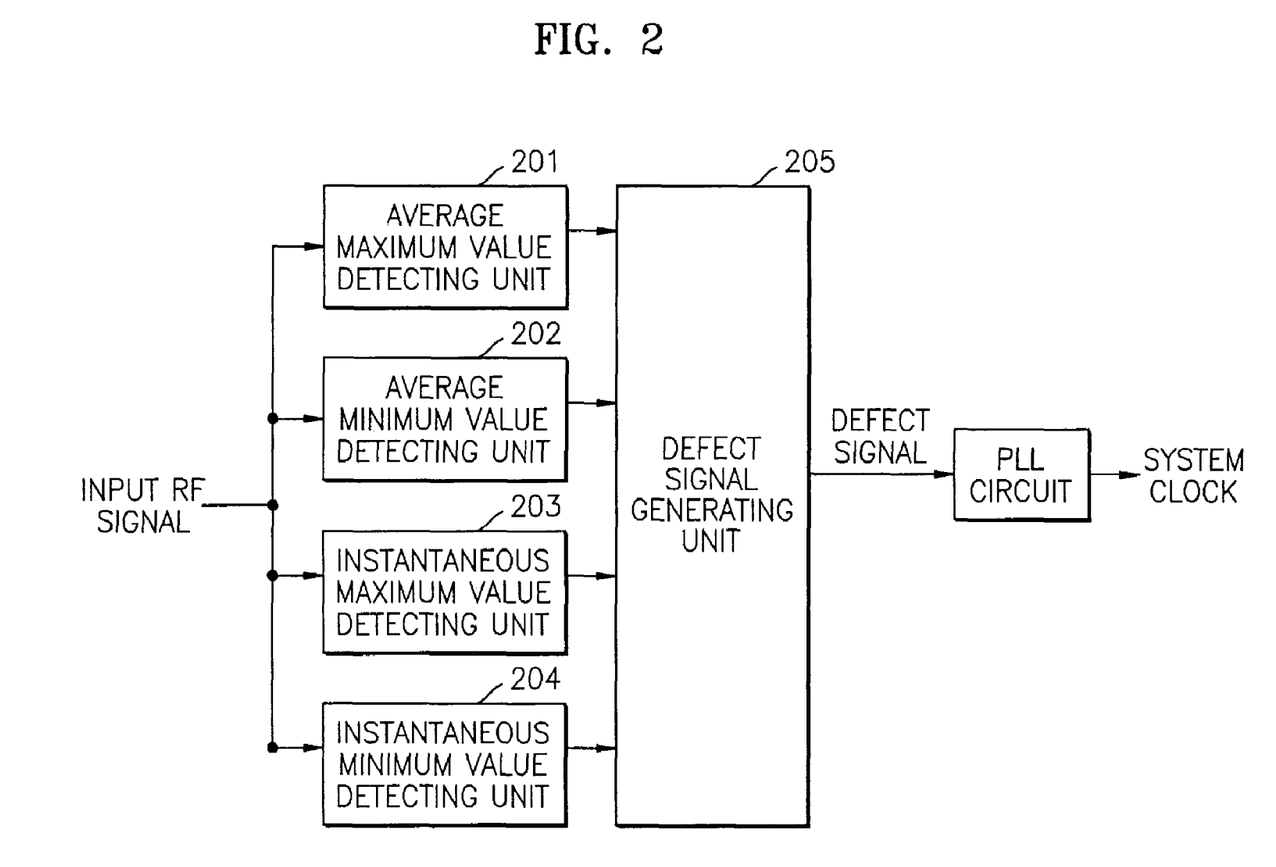
FIG. 2 is a block diagram of a defect signal generating apparatus according to an embodiment of the present invention.

FIG. 2 is a block diagram of a defect signal generating apparatus according to an embodiment the present invention. Referring to FIG. 2, the defect signal generating apparatus includes an average maximum value detecting unit 201, an average minimum value detecting unit 202, an instantaneous maximum value detecting unit 203, and an instantaneous minimum value detecting unit 204 to each of which an RF signal is input.

The RF signal refers to a signal that is read from an optical disc using a pickup and then pre-processed. Pre-processing is a process of generating a summing signal (RF signal) which is made into binary data by processing several kinds of signals read by the pickup.

The average maximum value detecting unit 201 receives the RF signal and then calculates an average maximum value of the RF signal. Here, the average maximum value is an average value of maximum values of RF signals obtained by dividing the RF signal every period of time.

Figure 3:
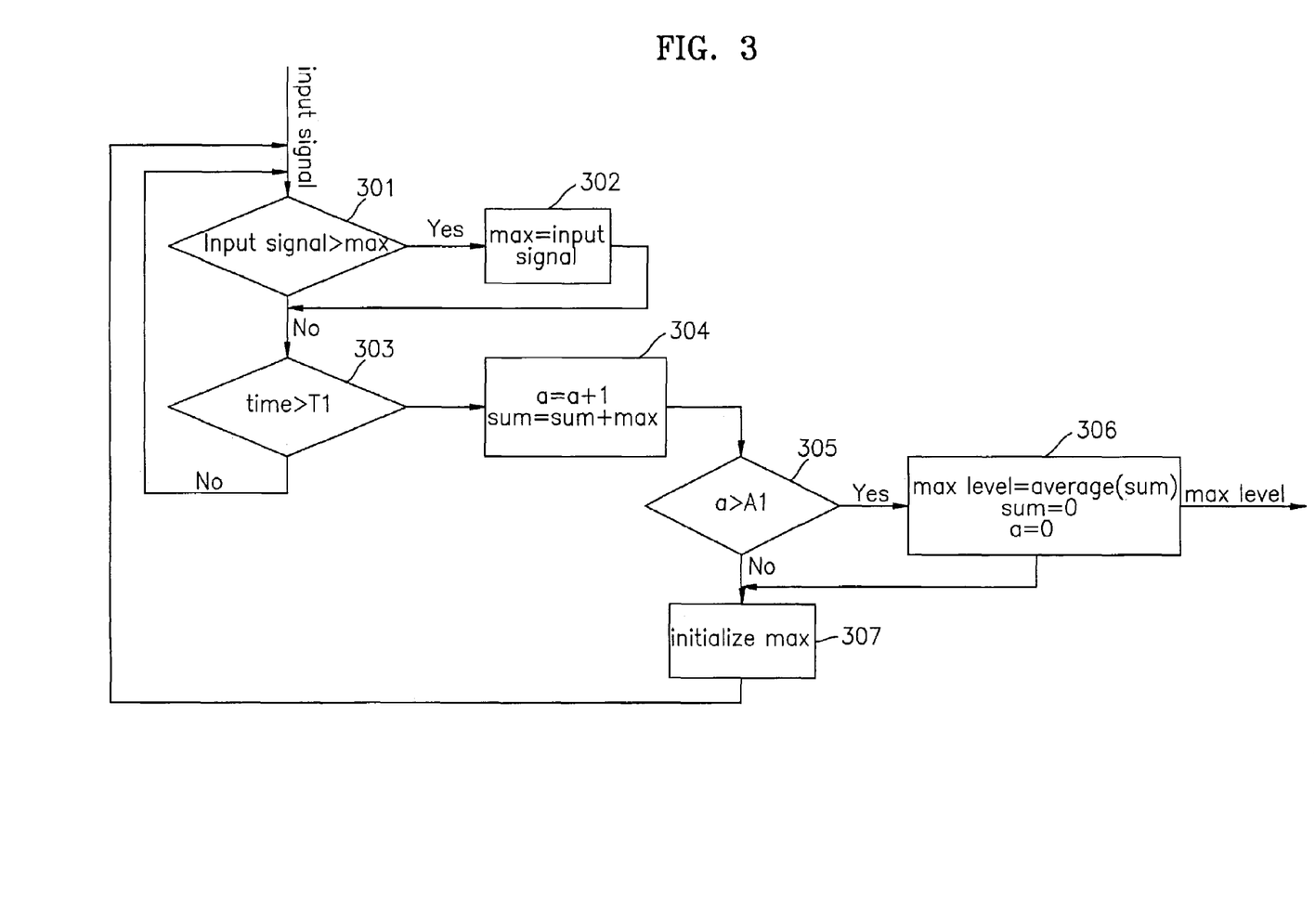
FIG. 3 is a flowchart explaining a process of detecting an average maximum value using an average maximum value detecting unit shown in FIG. 2.

FIG. 3 is a flowchart explaining a process of detecting the average maximum value using the average maximum value detecting unit 201 shown in FIG. 2. In operation 301, whether a value of an input RF signal is greater than an initialized parameter "max" is determined. If the value of the input RF signal is greater than the initialized parameter "max", in operation 302, the value of the RF signal is stored as the parameter "max".

If the value of the input RF signal is not greater than the initialized parameter "max" or after operation 302 is performed, in operation 303, whether the time required for receiving the RF signal is greater than the set time T1 is determined.

In operation 303, if the time required for receiving the RF signal is less than the set time T1, the process moves back to operation 301. If the time required for receiving the RF signal is greater than the set time T1, the value of the RF signal stored as the parameter "max" and an initialized parameter "sum" are summed and then stored as the parameter "sum" in operation 304. In operation 304, the number of values of the parameter "max" summed with the parameter "sum" is counted. In operation 305, whether the counted number is greater than a predetermined number is determined. If the counted number is less than the predetermined number, in operation 307, the parameter "max" is initialized and then the process again moves back to operation 301.

If the counted number is greater than the predetermined number, in operation 306, an average value of maximum values of the parameter "max" is calculated and output using the parameter "sum" and the counted number, the parameter "sum" and the counted number are initialized, and the process proceeds to operation 307.

The average minimum value detecting unit 202 receives the RF signal and calculates an average minimum value of the RF signal. The, the average minimum value refers to an average value of minimum values of RF signals obtained by dividing the RF signal every period of time.

Figure 4:
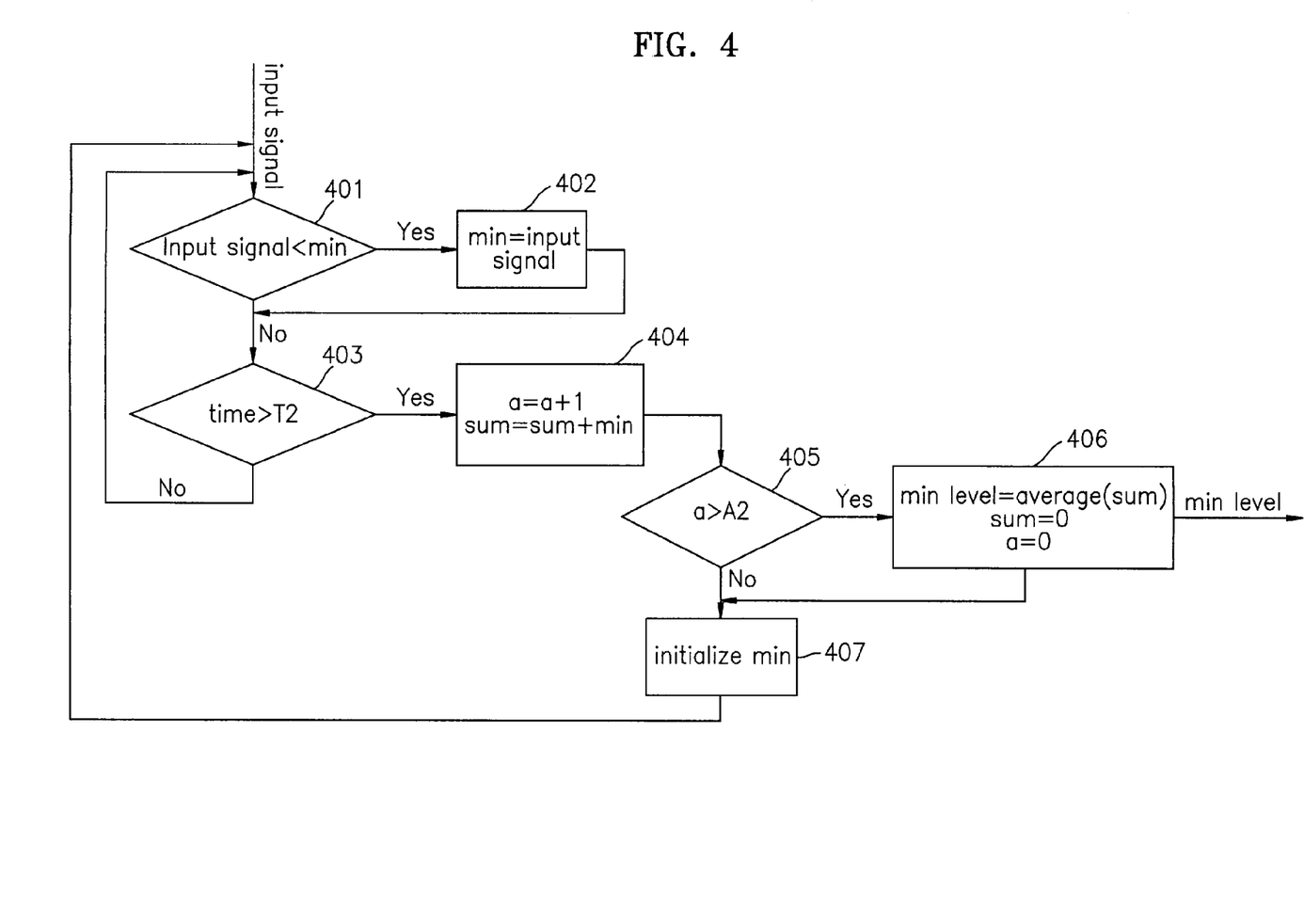
FIG. 4 is a flowchart explaining a process of detecting an average minimum value using an average minimum value detecting unit shown in FIG. 2.

FIG. 4 is a flowchart explaining a process of detecting an average minimum value using the average minimum value detecting unit 202 shown in FIG. 2. In operation 401, whether a value of the RF signal is less than an initialized parameter "min" is determined. If the value of the RF signal is less than the parameter "min", in operation 402, the value of the RF signal is stored as the parameter "min".

If the value of the RF signal is greater than the parameter "min" or after operation 402 is performed, in operation 403, whether the time required for receiving the RF signal is greater than a set time T2 is determined. If the time required for receiving the RF signal is less than the set time T2, the process moves back to operation 401.

If the time required for receiving the RF signal is greater than the set time T2, a value is calculated by summing the parameter "min" and an initialized parameter "sum" and then stored as the parameter "sum" in operation 404. In operation 404, the number of values of the parameter "min" summed with the parameter "sum" is counted.

In operation 405, whether the counted number is greater than a predetermined number is determined. If the counted number is less than the predetermined number, in operation 407, the parameter "min" is initialized and then the process moves back again to operation 401. If the counted number is greater than the predetermined number, in operation 406, an average value of minimum values of the parameter "min" is calculated and output using the parameter "sum" and the counted number, the parameter "sum" and the counted number are initialized, and the process moves to operation 407.

The instantaneous maximum value detecting unit 203 receives the RF signal and calculates an instantaneous maximum value of the RF signal. The instantaneous maximum value is a maximum value at an instant of time when the RF signal is input or a maximum value of the RF signal input for a short period of time.

Figure 5:
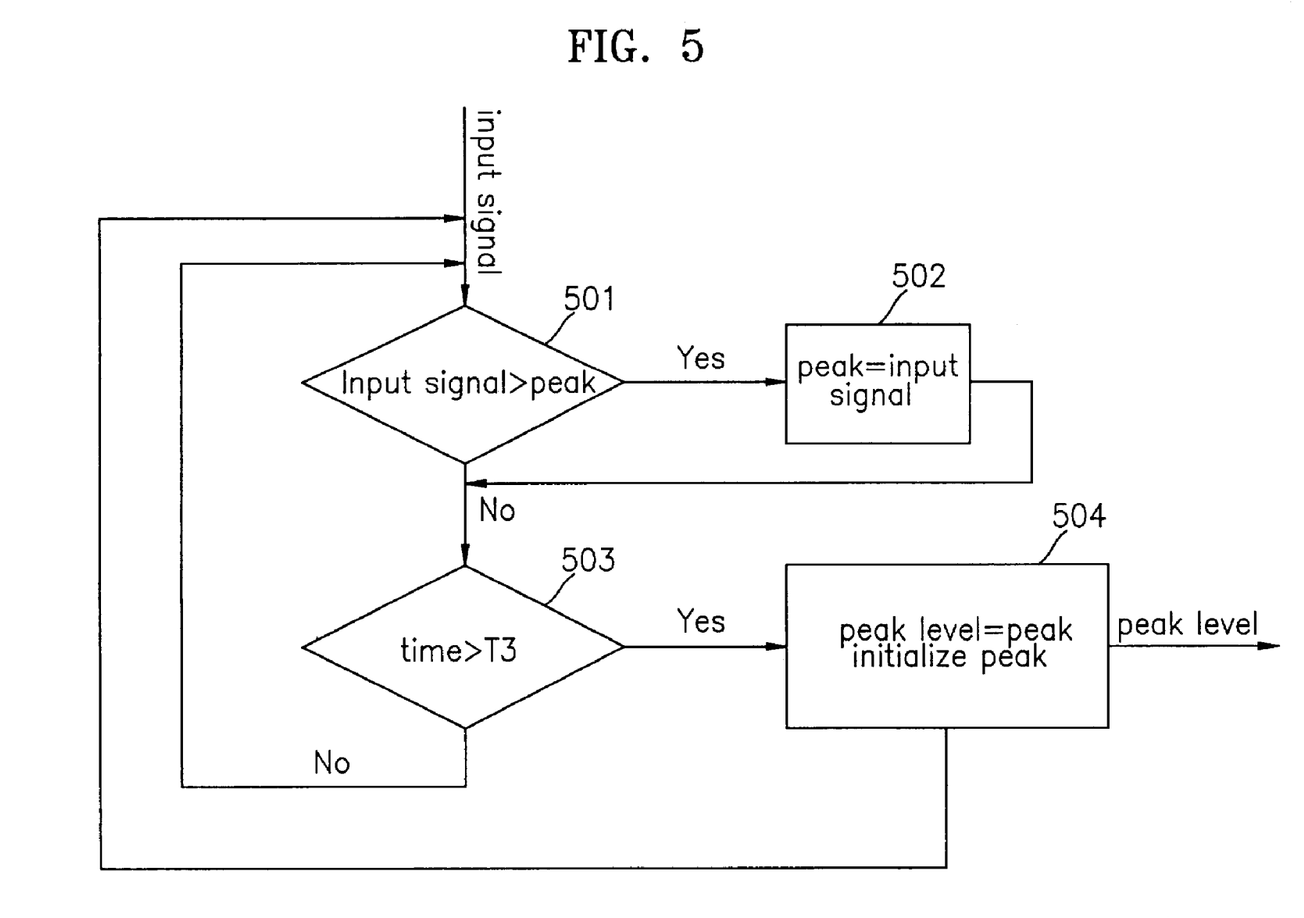
FIG. 5 is a flowchart explaining a process of detecting an instantaneous maximum value using an instantaneous maximum value detecting unit shown in FIG. 2.

FIG. 5 is a flowchart explaining a process of detecting the instantaneous maximum value using the instantaneous maximum value detecting unit 203 shown in FIG. 2. In operation 501, whether a value of an input RF signal is greater than an initialized parameter "peak" is determined. If the value of the input RF signal is greater than the parameter "peak", in operation 502, the value of the input RF signal is stored as the parameter "peak".

If the value of the input RF signal is not greater than the parameter "peak" or after operation 502 is performed, in operation 503, whether the time required for receiving the RF signal is greater than a set time T3 is determined. If the time required for receiving the RF signal is less than the set time T3, the process returns to operation 501.

If the time required for receiving the RF signal is greater than the set time T3, in operation 504, the parameter "peak" is output as an instantaneous maximum value, the parameter "peak" is initialized, and the process moves again to operation 501.

The instantaneous minimum value detecting unit 204 receives the RF signal and calculates an instantaneous minimum value of the RF signal. Here, the instantaneous minimum value is an instantaneous minimum value at an instant of time when the RF signal is input or a minimum value of the RF signal input for a short period of time.

Figure 6:
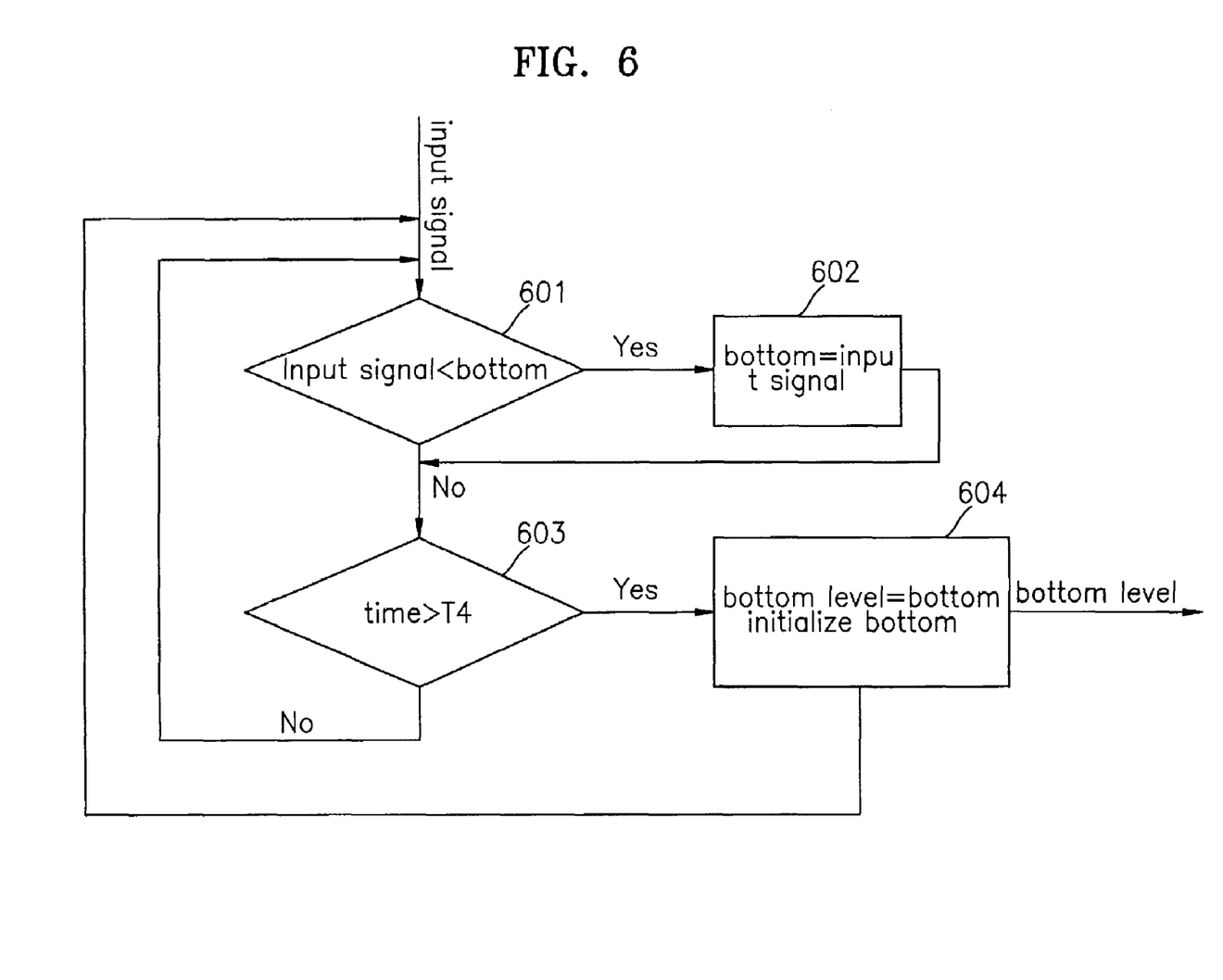
FIG. 6 is a flowchart explaining a process of detecting an instantaneous minimum value using an instantaneous minimum value detecting unit shown in FIG. 2.

FIG. 6 is a flowchart explaining a process of detecting the instantaneous minimum value using the instantaneous minimum value detecting unit 204 shown in FIG. 2. In operation 601, whether a value of the RF signal is less than an initialized parameter "bottom" is determined. If the value of the RF signal is less than the parameter "bottom", in operation 602, the value of the RF signal is stored as the parameter "bottom".

If the value of the RF signal is not less than the parameter "bottom" or after operation 602 is performed, in operation 603, whether the time required for receiving the RF signal is greater than a set time T4 is determined. If the time required for receiving the RF signal is less than the set time T4, the process moves back to operation 601.

If the time required for receiving the RF signal is greater than the set time T4, in operation 604, the parameter "bottom" is output as an instantaneous minimum value, the parameter "bottom" is initialized, and the process again moves back to operation 601.

The defect signal generating unit 205 receives the average maximum value, the average minimum value, the instantaneous maximum value, and the instantaneous minimum value, determines whether the RF signal has a defect based on a predetermined peak threshold level and a bottom threshold level, and if the RF signal has the defect, generates a defect signal according to the logical expression 1 below.

If ((average maximum value−peak threshold level)
>instantaneous maximum value) or (average
minimum value−bottom threshold level)*instantaneous minimum value)) then generate
defect signal else do not generate defect signal.

Figure 7:
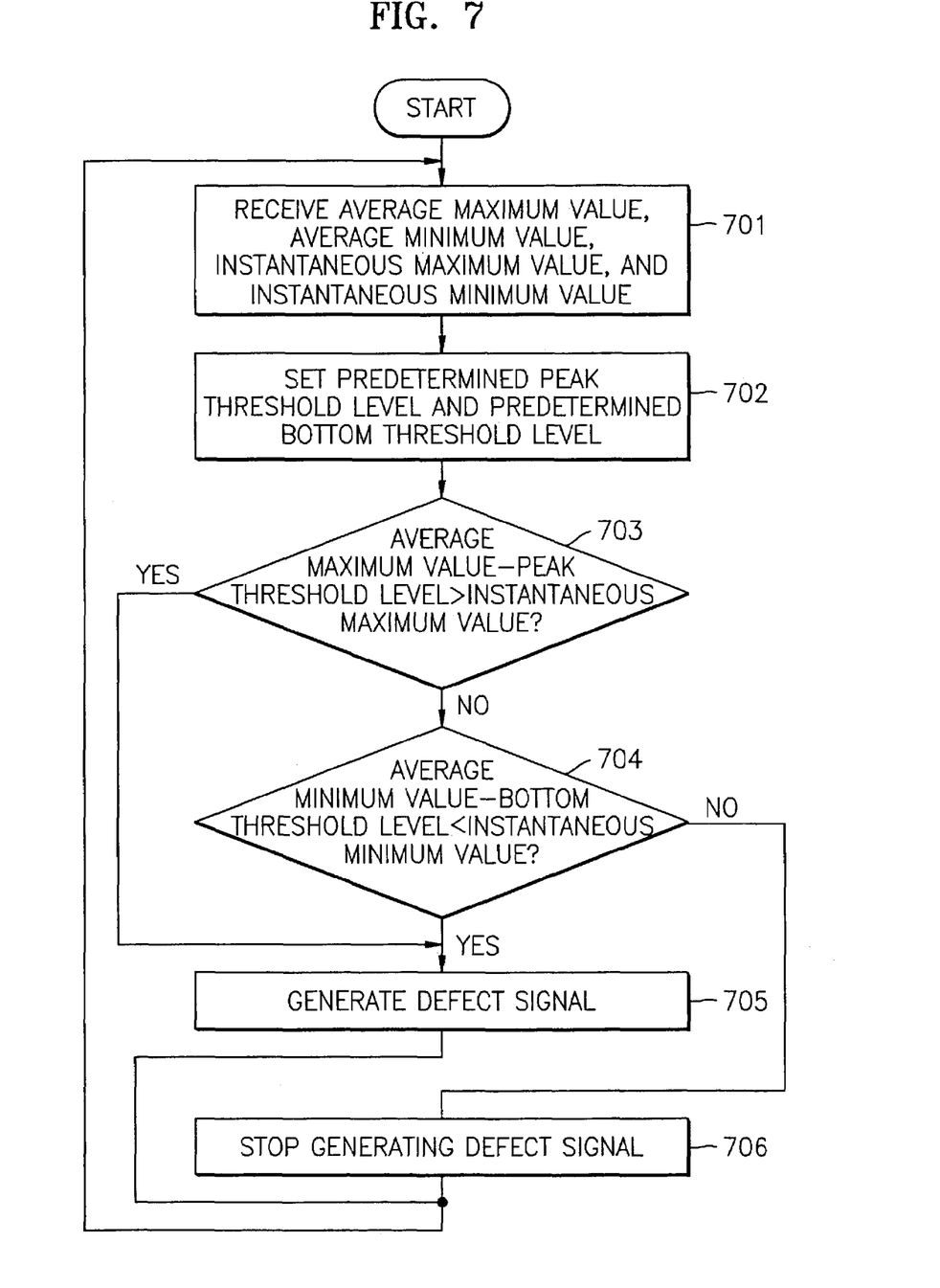
FIG. 7 is a flowchart explaining a process of generating a defect signal using a defect signal generating unit shown in FIG. 2.

FIG. 7 is a flowchart explaining a process of generating the defect signal using the defect signal generating unit 205 shown in FIG. 2. In operation 701, the average maximum value, the average minimum value, the instantaneous maximum value, and the instantaneous minimum value are received. In operation 702, a predetermined peak threshold level and a predetermined bottom threshold level are set. In operation 703, whether a value obtained by subtracting the predetermined peak threshold level from the average maximum value is greater than the instantaneous maximum value is determined.

If the value is not greater than the instantaneous maximum value, the method proceeds to operation 704. In operation 704, whether a value obtained by subtracting the predetermined bottom threshold level from the average minimum value is less than the instantaneous minimum value is determined. In operation 705, if the value is greater than the instantaneous maximum value in operation 703 and the value is less than the instantaneous minimum value in operation 704, or, if the value is less than the instantaneous maximum value in operation 703, the defect signal is generated and the method begins again at operation 701. If the value is not less than the instantaneous minimum value in operation 704, in operation 706, the defect signal is not generated and then the process moves again to operation 701 to repeat the method.

The defect signal generating apparatus according to the present invention may further include a controller (not shown) that sets the peak and bottom threshold levels necessary for actively detecting the defect signal. The controller may generally generate various kinds of signals necessary for detecting defects from a microcomputer or other programmable digital circuits. Here, the controller may further output the time T1 required for detecting the average maximum value, the number A1 of maximum values necessary for calculating the average maximum value, the time T2 required for detecting the average minimum value, the number A2 of minimum values necessary for calculating the average minimum value, the time T3 required for detecting the instantaneous maximum value, and the time T4 required for detecting the instantaneous minimum value.

The defect signal detected in the above-described process may be used for various purposes. For example, the defect signal is input to a phase-locked loop (PLL) so as to serve to prevent the abnormal operation of the PLL due to the input of an error signal by holding the PLL while detecting the defect signal. The PLL is described in detail in Korean Patent Application No. 1999-19020 and thus will not be explained herein.

In general, the times T1 and T2 are greater than the times T3 and T4, and the numbers A1 and A2 are within a range of 64–256. The controller is free to change the times T1, T2, T3, and T4, and the numbers A1 and A2.

A defect detecting circuit according to the present invention can automatically determine the strength of an input signal, and if the strength of the input signal is greater than a predetermined value, the defect detecting circuit can determine the input signal as a defect signal. Thus, the defect detecting circuit can accurately determine a desired defect signal and control conditions under which the defect signal is detected, using a controller. As a result, the defect detecting circuit can detect a defect signal suitable for the specifications of a disc. Also, since the detected defect signal is input to a PLL, the abnormal operation of the PLL can be prevented, thereby improving the performance of the defect detecting circuit.

The above-described embodiments of the present invention can be written as programs which can be executed on a computer. The embodiments can also be realized on a general-purpose digital computer executing the programs using a computer-readable medium. Computer-readable recording media include magnetic storing media (e.g., ROMs, floppy discs, hard discs, and so forth), optical reading media (e.g., CD-ROMs, DVDS, and so forth), and the like. Computer-readable recording media also include apparatuses realized in the form of a carrier wave (e.g., transmission via the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, the scope of the present invention must be determined by the appended claims and not by the above embodiments, and all differences included within the range equivalent to the scope of the present invention must be interpreted as being included in the present invention.

What is claimed is:

1. An apparatus detecting a defect in a radio frequency (RF) signal from an optical disc, the apparatus comprising:
    an average maximum value detecting unit that calculates an average maximum value of maximum values of the RF signal;
    an average minimum value detecting unit that calculates an average minimum value of minimum values of the RF signal;
    an instantaneous maximum value detecting unit that calculates a maximum value of the RF signal at an instant of time when the RF signal is input;
    an instantaneous minimum value detecting unit that calculates a minimum value of the RF signal at an instant of time when the RF signal is input; and
    a defect detecting unit that compares the average maximum value, the average minimum value, the instantaneous maximum value, and the instantaneous minimum value and generates a defect signal indicating that the RF signal is abnormal, using a predetermined peak threshold level and a predetermined bottom threshold level.

2. The apparatus of claim 1, wherein the average maximum value detecting unit divides the RF signal every period of time T1, calculates maximum values of the RF signal corresponding to every period of time T1, and calculates the average maximum value of the maximum values of the RF signal based on the last maximum value of the RF signal.

3. The apparatus of claim 1, wherein the average minimum value detecting unit divides the RF signal every predetermined period of time T2, calculates minimum values of the RF signal corresponding to every predetermined period of time T2, and calculates the average minimum value of the minimum values of the RF signal based on the last minimum value of the RF signal.

4. The apparatus of claim 1, wherein the instantaneous maximum value detecting unit calculates the instantaneous maximum value of the RF signal received for a predetermined period of time T3.

5. The apparatus of claim 1, wherein the instantaneous minimum value detecting unit calculates the instantaneous minimum value of the RF signal received for a predetermined period of time T4.

6. The apparatus of claim 1, wherein the defect detecting unit receives the average maximum value, the average minimum value, the instantaneous maximum value, and the instantaneous minimum value, and if the instantaneous maximum value is less than a value obtained by subtracting the predetermined peak threshold value from the average maximum value or the instantaneous minimum value is greater than a value obtained by subtracting the predetermined bottom threshold value from the average minimum value, the defect signal generating unit generates the defect signal, and if not, stops generating the defect signal.

7. A method of detecting a defect in an RF signal from an optical disc, the method comprising:
    receiving the RF signal corresponding to data recorded on the optical disc;
    calculating an average maximum value of maximum values of the RF signal;
    calculating an average minimum value of minimum values of the RF signal;
    calculating an instantaneous maximum value that is a maximum value of the RF signal at an instant of time when the RF signal is input;
    calculating an instantaneous minimum value that is a minimum value of the RF signal at an instant of time when the RF signal is input; and
    generating a defect signal indicating that the RF signal is abnormal using a predetermined peak threshold level and a predetermined bottom threshold level from the average maximum value, the average minimum value, the instantaneous maximum value, and the instantaneous minimum value.

8. A computer-readable medium controlling a computer to detect a defect in an RF signal from an optical disk by:
    receiving the RF signal corresponding to data recorded on the optical disc;
    calculating an average maximum value of maximum values of the RF signal;
    calculating an average minimum value of minimum values of the RF signal;
    calculating an instantaneous maximum value that is a maximum value of the RF signal at an instant of time when the RF signal is input;
    calculating an instantaneous minimum value that is a minimum value of the RF signal at an instant of time when the RF signal is input; and
    generating a defect signal indicating that the RF signal is abnormal with a predetermined peak threshold level and a predetermined bottom threshold level from the average maximum value, the average minimum value, the instantaneous maximum value, and the instantaneous minimum value.

9. A method of producing a defect signal indicating a defect in an RF signal from an optical disc, the method comprising:
    calculating an average maximum value, an average minimum value, an instantaneous maximum value, and an instantaneous minimum value of the RF signal from the optical disc; and
    producing the defect signal indicating that the RF signal is abnormal from the average maximum value, the average minimum value, the instantaneous maximum value, and the instantaneous minimum value.

10. The method of claim 9, wherein the calculating the average maximum value comprises:
    sampling the signal at a time interval T1;
    calculating maximum values of the signal corresponding to each time interval T1; and calculating the average maximum value of the maximum values of the RF signal based on a last maximum value of the RF signal.

11. The method of claim 9, wherein the calculating the average minimum value comprises:
sampling the RF signal at time interval T2;
calculating minimum values of the RF signal corresponding to each time interval T2; and
calculating the average minimum value of the minimum values of the RF signal based on a last minimum value of the RF signal.

12. The method of claim 9, wherein the calculating the instantaneous maximum value comprises:
determining the instantaneous maximum value of the RF signal received during a time interval T3.

13. The method of claim 9, wherein the calculating the instantaneous minimum value comprises:
determining the instantaneous minimum value of the RF signal received during a time interval T4.

14. The method of claim 9, further comprising:
receiving the RF signal from the optical disc.

15. The method of claim 9, further comprising:
subtracting a predetermined peak threshold value from the average maximum value; and
stopping the producing of the defect signal if the instantaneous maximum value is greater than the value obtained by subtracting the predetermined peak threshold value from the average maximum value;
wherein the producing comprises producing the defect signal if the instantaneous maximum value is less than the value obtained by subtracting the predetermined peak threshold value from the average maximum value.

16. The method of claim 9, further comprising:
subtracting a predetermined bottom threshold value from the average minimum value; and
stopping the producing of the defect signal if the instantaneous minimum value is less than a value obtained by subtracting the predetermined bottom threshold value from the average minimum value; and
wherein the producing comprises producing the defect signal if the instantaneous minimum value is greater than a value obtained by subtracting the predetermined bottom threshold value from the average minimum value.

17. A method of generating a defect signal from an optical disc, comprising:
receiving a radio frequency (RF) signal corresponding to data recorded on the optical disc for a time period T1;
calculating an average maximum value of maximum values of the RF signal and an average minimum value of minimum values of the RF signal during the time period T1;
determining an instantaneous maximum value that is a maximum value of the RF signal and an instantaneous minimum value that is a minimum value of the RF signal as the calculating occurs;
generating the defect signal based on the average maximum value, the average minimum value, the instantaneous maximum value, the instantaneous minimum value.

18. The method of claim 17, further comprising:
processing several kinds of signals read by an optical pickup into the RF signal.

19. The method of claim 17, wherein the calculating the average maximum value comprises:
determining whether a value of the RF signal is greater than an initial parameter "max";
storing the RF signal as a parameter "max" if the value of the RF signal is not greater than the initial parameter "max"; and
repeating the calculating if the time required to receive the RF signal is less than the time period T1;
storing the value of the RF signal as the parameter "max" if the time required for receiving the RF signal is greater than the time period T1.

20. The method of claim 19, further comprising:
summing the parameter "max" and an initial "sum" to obtain a parameter "sum"; and
storing the parameter "sum".

21. The method of claim 20, further comprising:
counting a number of values of the parameter "max" summed with the initial "sum";
initializing the parameter "max" if the counted number is less than a predetermined number and repeating the determining whether the value of the RF signal is greater than the initialized parameter "max"; and
calculating an average value of maximum values of the parameter "max" if the counted number is greater than the predetermined number;
initializing the parameter "max"; and
repeating the determining whether the value of the RF signal is greater than the initialized parameter "max".

22. The method of claim 17, wherein the calculating further comprising:
determining whether a value of the RF signal is less than an initialized parameter "min";
storing the RF signal as "min" if the value of the RF signal is less than the parameter "min";
determining whether a time required to receive the RF signal is greater than a time period T2; and
repeating the determining whether the value of the RF signal is less than an initialized parameter "min" if the time required for receiving the RF signal is less than the predetermined time period T2.

23. The method of claim 22, further comprising:
calculating a value by summing the parameter "min" and an initialized parameter "sum" if the time required for receiving the RF signal is greater than the time period T2; and
storing the values of the parameter "sum".

24. The method of claim 23, further comprising:
counting a number of values of the parameter "min" summed with the parameter "sum"; and
determining whether the counted number is greater than a predetermined number; and
calculating an average value of minimum values of the parameter "min" with the parameter "sum" and the counted number if the counted number is greater than the predetermined number;
initializing the parameter "min"; and
repeating the determining whether the value of the RF signal is less than the initialized parameter "min".

25. The method of claim 17, further comprising:
calculating the instantaneous maximum value by a maximum value at an instant of time when the RF signal is input.

26. The method of claim 25, wherein the calculating the instantaneous maximum value comprises:
determining whether a value of an RF signal is greater than an initialized parameter "peak";
storing the RF signal as the "peak" if the value of the input RF signal is greater than the parameter "peak";
determining whether a time required to receive the RF signal is greater than a predetermined time period T3;

outputting the parameter "peak" as the instantaneous maximum value and initializing the parameter "peak" if the time required to receive the RF signal is greater than the time period T3; and repeating the determining whether the value of the RF signal is greater than the initialized parameter "peak".

27. The method of claim 17 wherein the calculating the instantaneous minimum value comprises:

determining the instantaneous minimum value over a short time period when the RF signal is input.

28. The method of claim 27, wherein the calculating the instantaneous minimum value further comprises:

determining whether a value of the RF signal is less than an initialized parameter "bottom";

storing the value of the RF signal as the parameter "bottom" if the value of the RF signal is less than the parameter "bottom";

determining whether the time required to receive the RF signal is greater than a time period T4;

initializing the parameter "bottom" if the time required to receive the RF signal is greater than the time period T4;

outputting the parameter "bottom" as the instantaneous minimum value if the time required to receive the RF signal is greater than the time period T4; and repeating the determining whether the value of the RF signal is less than the initialized parameter "bottom".

29. The method of claim 17, wherein the generating the defect signal comprises:

setting a peak threshold level and a bottom threshold level; and generating the defect signal according to a logical expression:

if (average maximum value−peak threshold level)
>instantaneous maximum value or if (average
minimum value−bottom threshold level)<instantaneous minimum value, then generate the defect signal,
else do not generate defect signal.

30. The method of claim 17, wherein the generating the defect signal comprises:

determining whether a value obtained by subtracting a predetermined peak threshold level from the average maximum value is greater than the instantaneous maximum value;

determining whether a value obtained by subtracting a predetermined bottom threshold level from the average minimum value is less than the instantaneous minimum value if the value is not greater than the instantaneous maximum value;

generating the defect signal if the value is greater than the instantaneous maximum value or the value is less than the instantaneous minimum value; and not generating the defect signal if the value is not less than the instantaneous minimum value.

31. The method of claim 30, further comprising:

repeating the determining whether the value obtained is greater than the instantaneous maximum value and the determining whether the value obtained is less than the instantaneous minimum value.

32. The method of claim 17, further comprising:

actively detecting a defect by generating signals and processing information.

33. The method of claim 32, wherein the generating the signals and the processing the information comprises:

setting the time period T1 required to detect the average maximum value; and determining a number A1 of maximum values necessary for calculating the average maximum value.

34. The method of claim 32, wherein the generating the signals and the processing the information comprises:

setting a time period T2 required to detect the average minimum value; and determining a number A2 of maximum values necessary for calculating the average minimum value.

35. The method of claim 32, wherein the generating the signals and the processing the information comprises:

setting a time T3 required to detect the instantaneous maximum value and a time T4 required for detecting the instantaneous minimum value;

setting the time period T1 required to detect the average maximum value;

determining a number A1 of maximum values necessary for calculating the average maximum value;

setting a time period T2 required to detect the average minimum value; and determining a number A2 of maximum values necessary for calculating the average minimum value; and setting a time T3 required to detect the instantaneous maximum value and a time T4 required for detecting the instantaneous minimum value; and wherein, the times T1 and T2 are greater than the times T3 and T4 and the numbers A1 and A2 are within a range of 64–256.

36. The method of claim 17, further comprising:

preventing abnormal operation of a phase-locked loop (PLL) by:

inputting the defect signal to the PLL, and holding the PLL while detecting the defect signal.

* * * * *

UNITED STATES PATENT AND TRADEMARK OFFICE
CERTIFICATE OF CORRECTION

PATENT NO.        : 7,057,991 B2                                              Page 1 of 1
APPLICATION NO.   : 10/444950
DATED             : June 6, 2006
INVENTOR(S)       : Hyun-soo Park et al.

It is certified that error appears in the above-identified patent and that said Letters Patent is hereby corrected as shown below:

Title Page, Item (75) Inventors, change "Jao-seong" to -- Jae-seong --

Signed and Sealed this

Twenty-eighth Day of November, 2006

JON W. DUDAS
*Director of the United States Patent and Trademark Office*